Patented Mar. 4, 1941

2,233,573

UNITED STATES PATENT OFFICE 2,233,573

COATING COMPOSITION FOR LITHOGRAPH PLATES AND METHOD OF APPLYING THE SAME

Arnold L. Ayers, Omaha, Nebr., assignor to Albert E. Tyler, Omaha, Nebr.

No Drawing. Application January 7, 1939, Serial No. 249,825

12 Claims. (Cl. 41—41.5)

This invention relates to a coating composition for lithograph plates and a method of applying the same, and more particularly to a composition adapted to strengthen the material of which the image on such plates is formed and to increase the sharpness of the printing produced by the image.

It is well known that one of the difficulties found in the use of lithograph plates is the damage from use and wear to the water repellent material from which the printing image is formed. This is particularly the case when a plate is filled up solid with ink and the ink is thereafter sponged off or otherwise removed.

In lithograph plates of the albumen type well known in the art, a metallic plate, usually composed of zinc, is coated with a light sensitive material such as albumen. The surface of the plate is exposed to light, which is passed through a filter and the photographic image which is to be printed. The portions of the albumen coating which are exposed to the light become water repellent, and are retained on the plate to form a printing image when the unexposed albumen is washed off. The plate is then completely prepared, and is ready for printing.

I have found that by the application of a new coating composition to the plate, either before, during, or after the formation of the image, the albumen layer may be strengthened, and the life of the plate, both on and off the press, increased. At the same time the plate will, of course, withstand rougher treatment without damage thereto. In addition, the plate may be filled up solid with ink at any time after treatment with my composition until the resulting coating is removed from the plate, and the excess ink removed by sponging off the plate with water or fountain etch without damage to the plate. Moreover, a plate which has been treated with my composition can be operated with the use of less water during printing than with the ordinary plate. As a result, the printing is sharper and has more brilliance than the printing produced by an ordinary lithographic plate. The treatment of a plate with my composition does not in any way affect the water repellent qualities of the albumen image.

My composition may be used with any plate for lithographic or planographic printing. Ordinarily a zinc plate is used, and as stated, the composition may be applied before, after, or during the formation of the image, which is usually composed of a layer of water repellent material such as albumen.

My composition comprises essentially a solution of silicates or polysilicates of sodium, ammonium, potassium, or other alkali metals, or a combination of these substances. I prefer to use sodium silicate, commonly called water glass. A solution of one part of sodium silicate to two parts of water is well adapted for my purpose. In addition, if desired, a small amount of cream of tartar may be added to the solution. The viscosity of the solution should be such that it will flow readily upon the plate and afford the maximum protection to the water repellent image.

The following are examples of solutions which are satisfactory for my purpose.

Example I 60 c. c. of water are added to 40 c. c. of water glass of a specific gravity of 60° Bé. The resulting solution has a specific gravity of approximately 1.14 at 78° F.

Example II 30 grains of cream of tartar, 70 c. c. of water, and 30 c. c. of a water glass solution. The water glass solution has a 60° Bé. concentration.

Although not all of the materials in this composition are completely dissolved in the water, for the purpose of convenience the mixture is referred to as a solution.

The composition, when applied to the surface of the plate, serves to strengthen the albumen and protect the image. At the same time the coating does not actually cover the albumen, and hence does not interfere with its water repellent qualities. In fact, in some respects the action of this composition more closely resembles that of impregnation than coating. This is particularly true when the solution is applied before the image is formed. Nevertheless, the mixture is applied as a coating, and is referred to as such herein.

The lithographic plate may be treated with the solution in any suitable manner. For instance, the treating operation may comprise a brushing, rubbing, or even dipping process.

If desired, the solution may be applied before the albumen image is formed. In this case the dry zinc plate may be coated with the solution, the plate dried, and the albumen image thereafter formed on the plate in the usual manner.

On the other hand, the plate, having an albumen image already formed thereon, may be coated with the solution and dried. If desired, the plate may be inked and the ink dried before the solution is applied.

When the solution is applied after the image is formed, a coating of the composition is formed on the plate which appears to extend over, or at least to the edges of the albumen of the image. When the image has not been formed, there may, in addition, be some combination between the albumen and the coating composition, since in such case the dry plate is treated with the solution and the albumen layer thereafter applied. At any rate, in either case the application of the solution serves to strengthen and protect the image.

Regardless of the manner in which the coating is applied, it is essential that the plate be thoroughly dried before use. This may be accomplished by rubbing the plate with an absorbent material to remove any excess solution, and thereafter fanning the plate or exposing it to a current of air which may be heated.

The solution should be applied in such a manner as to completely cover the plate, but it is unnecessary that a large quantity of the material be deposited thereon. In fact, 60 c. c. of solution will ordinarily be sufficient to cover 675 square inches of plate surface.

When my composition has been applied to a lithograph plate, it is unnecessary to use an acid etch in the printing process. Moreover, the coating produced serves to decrease the water used in the printing process, and produces a sharper and more distinct printing.

In lithographic or planographic printing processes, the plate is ordinarily wetted with water before the ink is applied. As a result, the ink is deposited only on the albumen image (the water repellent portion of the plate). It is believed that my composition serves to aid the water in preventing the deposition of ink and thus decreases the amount of water necessarily used in the printing process. Whatever the reason, it is a fact that my composition does serve to increase the sharpness and brilliance of the printing.

It is apparent from the foregoing that my composition is equally effective with plates used in dry lithography, since the image is strengthened and protected and the coating actually aids in preventing deposition of the ink upon portions of the plate not covered by the image.

Although I have set forth a specific composition including certain materials in exact proportions, it is apparent that there may be variations in the proportions thereof and that there may be equivalents of the materials disclosed which may be substituted therefor without departing from the spirit of my invention.

The foregoing detailed description has been given for clearness of understanding only, and no unnecessary limitations should be understood therefrom, but the appended claims should be construed as broadly as permissible, in view of the prior art.

I claim:

1. A coating composition for lithograph plates, adapted to preserve and protect an image fixed upon said plate and to increase the sharpness of an impression obtained therefrom, comprising, a silicate of an alkali metal and cream of tartar.

2. A coating composition for application to lithograph plates, adapted to preserve and protect an image formed upon said plate, comprising, a water solution of sodium silicate having a specific gravity of approximately 60° Bé.

3. A coating composition for application to lithograph plates, adapted to preserve and protect an image formed of a water repellent light sensitive material upon said plate, comprising a mixture of approximately 30 grains of cream of tartar, 30 c. c. of a sodium silicate solution having a specific gravity of 60° Bé., and 70 c. c. of water.

4. A lithograph plate of the character described, comprising a metallic base plate, a layer of albumen on said plate in the form of an image to be printed, said plate and the albumen image thereon having been treated with a solution of sodium silicate.

5. A method of applying a coating composition to lithograph plates to strengthen the image formed thereon, comprising, inking the plate, drying the inked plate, treating the inked plate with a solution of sodium silicate and cream of tartar, and thereafter drying the treated plate.

6. A method of applying a coating composition to lithograph plates to strengthen the image formed thereon, comprising treating the plate and the water repellent material thereon with a water solution of sodium silicate having a specific gravity of approximately 60° Baumé, and thereafter drying the plate.

7. A lithograph plate of the character described provided on the surface thereof with a photographically produced image, comprising a water repellent light sensitized material on said plate in the shape of an image to be printed, and a coating of an alkali metal silicate on said plate engaging said material.

8. A lithograph plate of the character described provided on the surface thereof with a photographically produced image, comprising a water repellent light sensitized layer of albumen on said plate in the shape of an image to be printed, and a sodium silicate coating on said plate engaging said albumen layer.

9. A lithograph plate of the character described, comprising a base plate, a water repellent light sensitized material on said plate in the form of an image to be printed, and a coating of an alkali metal silicate applied to said plate and said image.

10. A method of preparing a lithograph plate having a photographically produced image thereon, comprising applying to the plate a layer of a light sensitive material, exposing portions of the plate to light, removing the unexposed portions of said light sensitive material from the plate to form a printing image thereon, and treating the plate and the image thereon with a solution of an alkali metal silicate.

11. A method as set forth in claim 10, wherein the solution for treating the plate comprises sodium silicate.

12. A method of preparing a lithograph plate having a photographically produced image thereon, comprising coating the plate with a layer of light sensitive albumen, exposing portions of the plate to light, removing the unexposed portions of the albumen from the plate to form a printing image thereon, and treating the plate and the image thereon with a solution of sodium silicate.

ARNOLD L. AYERS.